A. SHAW.
Cultivator.
No. 97,319.
Patented Nov. 30, 1869.
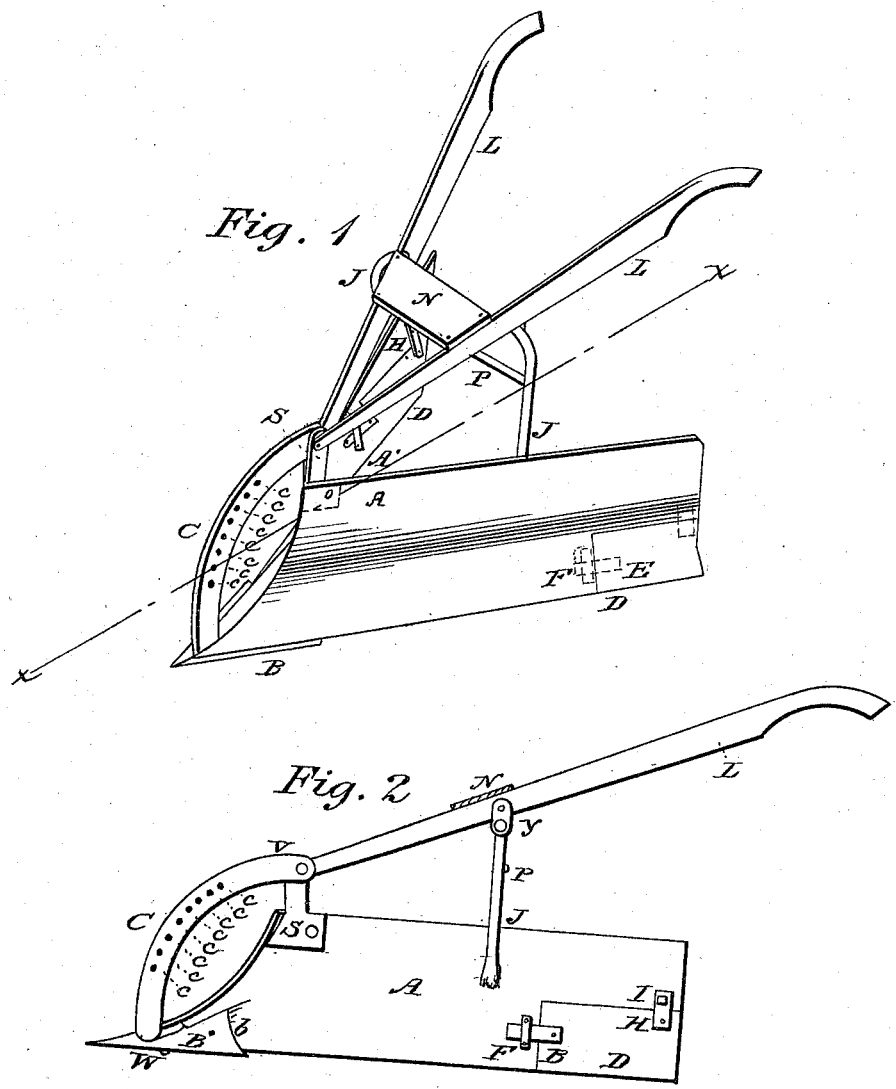

UNITED STATES PATENT OFFICE.

ALEXANDER SHAW, OF MONMOUTH, ILLINOIS.

IMPROVEMENT IN CULTIVATORS.

Specification forming part of Letters Patent No. 97,319, dated November 30, 1869; antedated November 22, 1869.

*To all whom it may concern:*

Be it known that I, ALEX. SHAW, of the city of Monmouth, county of Warren, and State of Illinois, have invented certain new and useful Improvements in Cultivators; and I hereby declare the following to be a full, clear, and exact description of the construction and operation of the same, reference being had to the accompanying drawings, making a portion of this specification, in which—

Figure 1 is a perspective view of my invention. Fig. 2 is a vertical central sectional view on the line $x\ x$, Fig. 1.

Similar letters of reference indicate corresponding parts in both figures.

The nature of this invention relates to improvements in that class of cultivators which is not mounted on wheels; and the invention consists in the combination of a cutter with double mold-boards, the cutter furnishing means of attaching the draft-animals.

It further consists in the simple manner of attaching handles and a point to the foregoing, so that the whole may furnish a simple, cheap, and effectual cultivator for going through corn or other plants in rows the "last time," and throwing the dirt to the rows.

To enable others to understand the construction and operation of my invention, I will proceed to describe it with reference to the drawings.

Letter A represents two mold-boards, with their concave sides forward and connected at their forward end, and extending forward to form a point.

Letter B represents a point attached to the under side of mold-boards A by means of bolt $b$, and projecting from beneath the mold-board both forward and at the sides.

Letter D is a plate held in a notch cut in the rear corner of the mold-boards, of a similar shape with itself, by means of plate H and bolt I at one end and bolt E and staple F at the other end. This plate D may be replaced when worn out by another.

C represents a semicircular cutter, with a point, W, at the lower end, which catches or engages in a notch in the point B, and is attached at the upper end to the arms $s$, which extend upward from the mold-boards A. This cutter C is also provided with a series of holes, $c\ c\ c$, to which the draft-animals may be attached, and by which the depth of running may be adjusted by using the higher or the lower hole.

L represents the handles, attached forward to the arms $s$, and supported back by the bow J, with brace P, and by the board N.

This cultivator is intended, as stated, to be used in "laying by" plants in rows when the dirt is desired to be thrown up to the rows in ridges.

What I claim as new, and desire to secure by Letters Patent, is—

The cutter C, with series of holes $c\ c\ c$, for regulating the depth, when combined with the mold-boards A, point B, handles L, bow J, and the plate D, substantially as described, and for the purpose set forth.

Signed at Galesburg, Illinois, this 10th of March, 1869.

ALEXANDER SHAW.

Witnesses:
   P. R. RICHARDS,
   J. B. HARSH.